Dec. 15, 1959 H. K. RICHARDS 2,917,633
RADIATION DETECTING AND TELEMETERING SYSTEM
Filed March 21, 1956 3 Sheets-Sheet 1

INVENTOR.

BY Hans K. Richards

ATTORNEY

Dec. 15, 1959   H. K. RICHARDS   2,917,633
RADIATION DETECTING AND TELEMETERING SYSTEM
Filed March 21, 1956   3 Sheets-Sheet 2

INVENTOR.
BY  Hans K. Richards
ATTORNEY

United States Patent Office 2,917,633
Patented Dec. 15, 1959

2,917,633

RADIATION DETECTING AND TELEMETERING SYSTEM

Hans K. Richards, Oak Lawn, Ill., assignor to the United States of America as represented by the United States Atomic Energy Commission Application March 21, 1956, Serial No. 573,058

2 Claims. (Cl. 250—83.6)

The present invention relates to instruments for the detection and measurement of ionizing radiation, and more especially to a novel radiation measuring system suitable for laboratory or field use and more especially adapted for remote monitoring purposes.

In monitoring the levels of radiation intensity present at various points remotely spaced over a large area, as during the tests of atomic weapons in a remote proving ground, or in obtaining the level of radioactivity at various points remotely spaced from a nuclear reactor which may discharge radioactive particulate material, it is desirable to receive and record all data at a central location. Especially in the case of weapons tests, it may be impossible or extremely dangerous for personnel to proceed to each radiation detector location for many hours after the initial blast. In other cases of remote monitoring, it is costly and time consuming to have personnel periodically visit each remote monitor station. The information received from radiation detectors is not in a form suitable for remote transmission, however. Means must be found to convert the ion current or pulse rate information into a signal form which can be readily carried from the detector to the recording center. The means chosen should be reliable, accurate, automatic, and reasonably simple, to avoid prohibitive expense in original cost and in operation.

I have found that a radiation detection and measurement system suitable for location at remote points can be provided by converting incident ionizing radiation at each point into respective control signals, utilizing each signal to determine the frequency of transmission of an electromagnetic signal, receiving the transmitted signals, and measuring and recording their respective frequency variations at a central location. To derive the frequency control signals, I utilize ferrroelectric materials made into electrical condensers in combination with a Geiger counter tube. The condensers have the peculiar property that their capacitance changes with a change in the voltage applied across their terminals. They are connected as part of the frequency-determining circuit of the transmitting electrical oscillators. I have also found that these condensers may be utilized with charged ionization chambers. Radiation entering the chambers will cause those detectors to discharge, thereby reducing the voltage at their terminals. That voltage is applied to the condenser, changing its capacitance, altering the reactance in the tuning circuit of the oscillator, and changing the frequency of oscillation.

Accordingly, it is an object of my invention to provide a sensitive, reliable instrument for detecting and measuring ionizing radiation which is especially suitable for remote monitoring of a plurality of separated locations. A further object of my invention is to provide a radiation monitoring system comprising a plurality of remote stations, each provided with a transmitting antenna, an oscillator for exciting said antenna, and means for varying the frequency of said oscillator responsive to the level of incident ionizing radiation, and a central station for receiving and recording data from each of said remote stations. A primary further object of my invention is to provide reliable, sensitive means for generating at each station an electromagnetic signal, the frequency of which varies responsive to the level of incident ionizing radiation. A further object of my invention is to provide improved oscillation generation means whose frequency varies responsive to radiation.

These and other objects of my invention will be apparent from the following detailed description of preferred embodiments thereof, when read in connection with the appended drawings, wherein.

Figure 1:
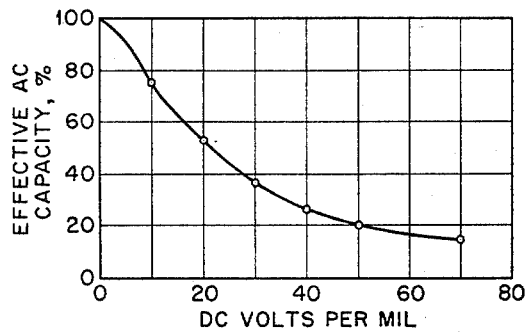
Figure 1 is a typical graph of the variation in capacitance with D.C. polarizing voltage of condensers utilizing a ferroelectric dielectric.

Referring now to Figure 1, it has been observed that in certain materials the dielectric constant can be caused to vary by application of a polarizing electric field, causing alignment of the electric dipoles therein. This effect is known as the ferroelectric effect. If a condenser is made from a dielectric material exhibiting this effect and charged with a voltage V, it will exhibit a capacitance C. When the voltage impressed is altered to $V \pm dV$ the capacitance will then be $C \mp dC$. Figure 1 illustrates the capacitance of such a condenser for different D.C. polarizing voltages. It may be seen that the curve has both a linear and a non-linear portion. I have found that for any specific range of radiation detection it is desirable to operate on the linear portion, so that the capacitance change will be directly proportional to the response of the detector element. I have found, however, that where wide ranges of radiation levels must be detected and measured, it may be desirable to operate on the essentially logarithmic portion of the curve.

Figure 2:
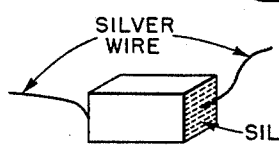
Figure 2 illustrates a sample ferroelectric condenser.

One readily available ferroelectric material is barium titanate, which has a dielectric constant of 6000 without polarization voltage. Figure 2 illustrates a preferred construction of a ferroelectric condenser. A rectangular block of barium titanate 2 mm. long, 1 mm. deep, and 1 mm. thick was cleaned in nitric acid and dried under a heat lamp. The electrodes were painted on the end surfaces with silver paint and leads of silver wire were attached during forming of the electrode. The surface electrodes were generally ¼ to 1 square mm. in area to provide condensers with the lowest possible value of capacitance, that is, about 8–12 micro-micro farads.

As stated above, I have found that ferroelectric condensers can be connected to the electrodes of a charged ionization chamber and also to the tuning circuit of an oscillator, so that when ionizing radiation discharges the ionization chamber the polarizing voltage applied to the ferroelectric condenser will be reduced and the oscillator frequency will change. As long as no radiation falls upon the chamber, the oscillator frequency should remain constant until the chamber is recharged. I have experienced certain difficulties in practical utilization of such instruments, however, due principally to the finite resistivity of the ferroelectric material. Because of this resistivity, the charge leaks off the ionization chamber, even in the absence of ionizing radiation, causing an undesirable change in the frequency of the oscillator. Changes in temperature also produces a drift in the oscillator, such that remote operation of these instruments has not proved satisfactory. I have found that the difficulties associated with these instruments can be overcome, however, utilizing the systems illustrated schematically in Figures 3 and 4.

Figure 3:
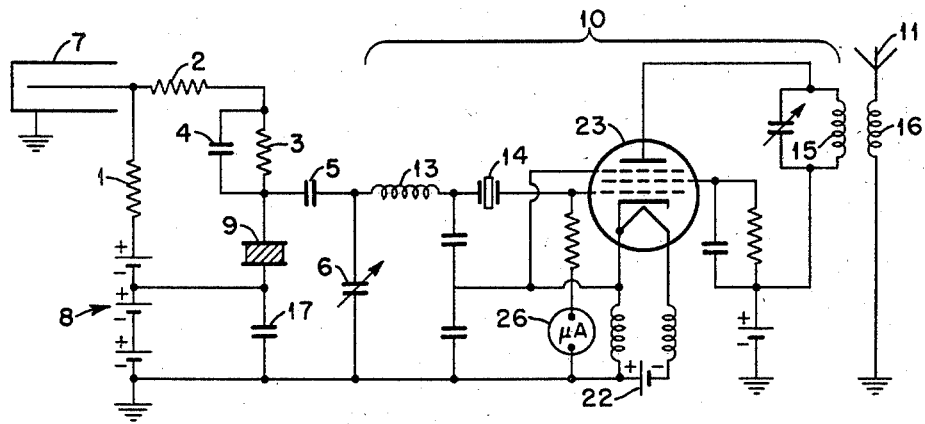
Figure 3 illustrates means for varying the frequency of an electronic oscillator responsive to the level of incident radiation.

Referring now to Figure 3, a Geiger tube 7 is provided for radition detection and is connected to a voltage source 8 through resistor 1 and to a ferroelectric condenser 9 through resistors 2 and 3. A condenser 4 is bridged across resistor 3 to provide a pulse integrating network. Condenser 9, about 30–60$\mu\mu$ farads, is coupled to the frequency determining circuit of a crystal controlled Clapp-type oscillator 10 through condensers 5, 6 and inductance 13, and is grounded for radio frequencies through condenser 17, about 0.1$\mu$ farads. The quartz crystal control provides a certain stability for the frequency "at rest" position, but permits sufficient leeway to vary the frequency within the required range. The oscillator is tuned to produce an output signal of a selected frequency, which output may be coupled to a suitable transmitting antenna 11 through a transformer having a primary 15 and a secondary 16.

Oscillator grid current may be measured at the transmitter by microammeter 26. In operation, a voltage of about 900 volts is impressed upon the radiation detector 7. When no current flows through the detector, 300 volts of this voltage is applied across condenser 9 and resistors 1—3. When radiation incident upon the detector 7 causes discharges to occur in the tube, current flows through resistor 1, lowering the voltage across condenser 9, increasing its capacitance, and lowering the frequency of the oscillator by a corresponding amount. Condenser 4, about .1–.4$\mu$ farads, serves to integrate the voltage at the counter so as to relate the frequency of discharge to the voltage applied across the condenser 9. For lower intensities of radiation, condenser 4 may be disconnected, and each pulse will vary the oscillator frequency individually.

Since the ferroelectric condenser is not subject to the entire high voltage impressed upon the radiation detector, but only to a small portion thereof, no breakdown of the ferroelectric material by high voltage occurs. Moreover, leakage across the condenser is of no consequence.

Figure 4:
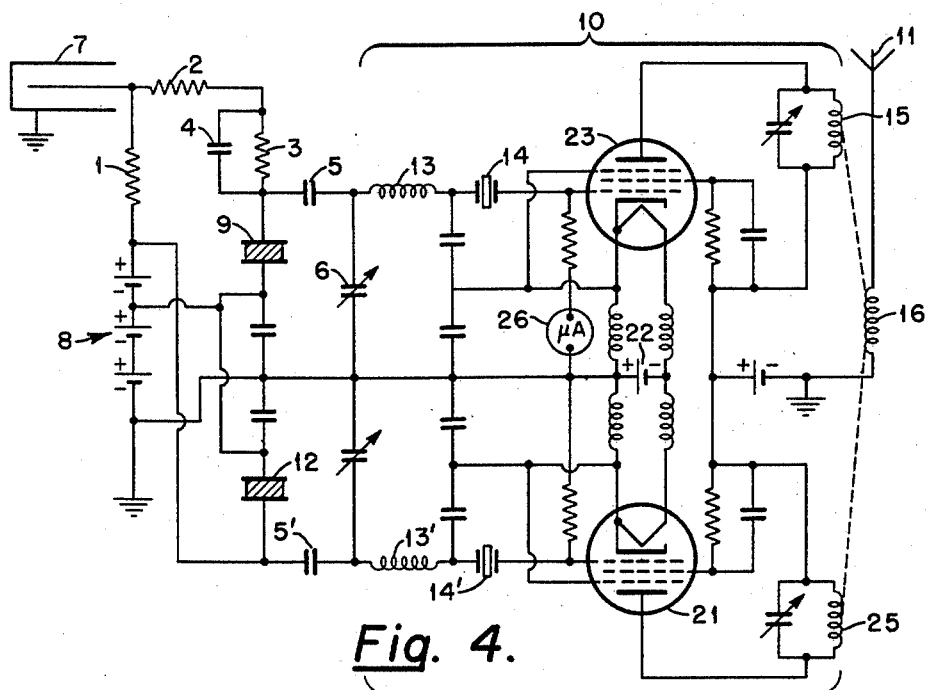
Figure 4 represents a preferred circuit for varying the oscillator frequency responsive to incident radiation.

Further improved operation results with the circuit shown in Figure 4, in which oscillator drift compensation is provided and a reference frequency is generated to allow beat frequency reception. A second ferroelectric condenser 12 is disposed adjacent the first ferroelectric condenser 9 in a common container. Identical voltages are impressed across the two elements by connection of one electrode of each to a common point on the source 8 and the opposite electrodes to points at a common potential when detector 7 is not conducting. Because the initial voltages are identical, changes in the capacitances due to direct radiation and temperature variations should be equal. An additional oscillator circuit 20 is also provided, and includes a tube 21 having its cathode heater fed from the same voltage supply 22 which feeds the cathode heater of the tube 23 in corresponding oscillator 10. The oscillator 20 is tuned to produce a reference frequency, while the oscillator 10 is tuned about 800–1600 cycles off the reference frequency. While operation at the same frequency is desirable, oscillators tend to maintain that frequency, so that no variation occurs, unless they are very carefully shielded. The two frequencies generated may be mixed at the antenna 11 by coupling both coils 15 and 25 to transmitting antenna 11 in any conventional manner.

It is apparent to those skilled in the art that while the present oscillator is illustrated by way of conventional electronic vacuum tubes, transistor powered oscillators may be utilized to generate the signal to feed the antenna, but with reduced range due to the present power dissipation limitations of transistors.

In the embodiments shown, the oscillator 10 has been operated on a nominal frequency of 2.5 megacycles, and the device has proved sensitive to less than .5 milliroentgen per hour, corresponding to the frequency change of 25 cycles per second. The response of the instrument is linear over the range from .5 to 4.0 mr. per hour.

Figure 5:
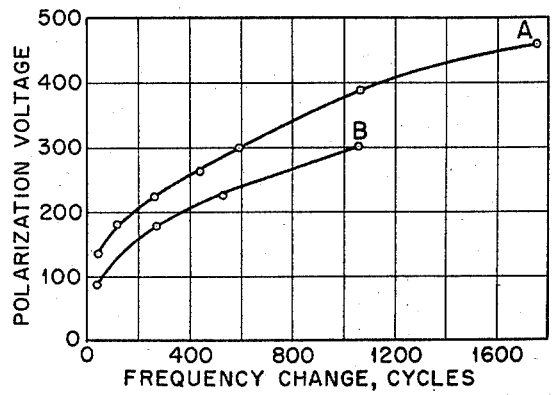
Figure 5 illustrates the frequency shift of a typical oscillator circuit with changes in the polarization voltage of the tuning condenser.

Referring now to Figure 5, curve A indicates the frequency change of a typical oscillator corresponding to changes in the polarization voltage of a ferroelectric condenser of 8.5 micro-micro farads in series with a fixed condenser of 27.5 micro-micro farads. Curve B illustrates the same ferroelectric condenser in series with a 13.7 micro-micro farads condenser, showing the effect of the total capacity on sensitivity of the instrument.

Figure 6:
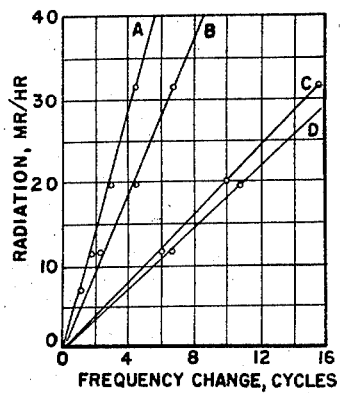
Figure 6 represents a sample calibration graph where frequency change in the oscillator output is plotted against the incident radiation level.

Referring now to Figure 6, the oscillator frequency change in cycles per second is plotted against the radiation incident upon a detector in milliroentgens per hour. Curve A was plotted with the same parameters as curve A of Figure 5. Sensitivity was increased as shown in curve B by reducing the total capacity as above described to a total of 17.5 micro-micro farads. Curves C and D illustrate the effect of radiation on the third harmonic of the fundamental frequency plotted with the same parameters as curves A and B. This illustrates the great increase in sensitivity obtained by transmission of the harmonic, rather than the fundamental frequency. While sensitivity is increased by a factor of 3, however, leakage effects also increase by the same factor in the ionization chamber-ferroelectric condenser combination with which the data for Figures 5 and 6 was obtained, so that reliable operation is not feasible.

Figure 8:
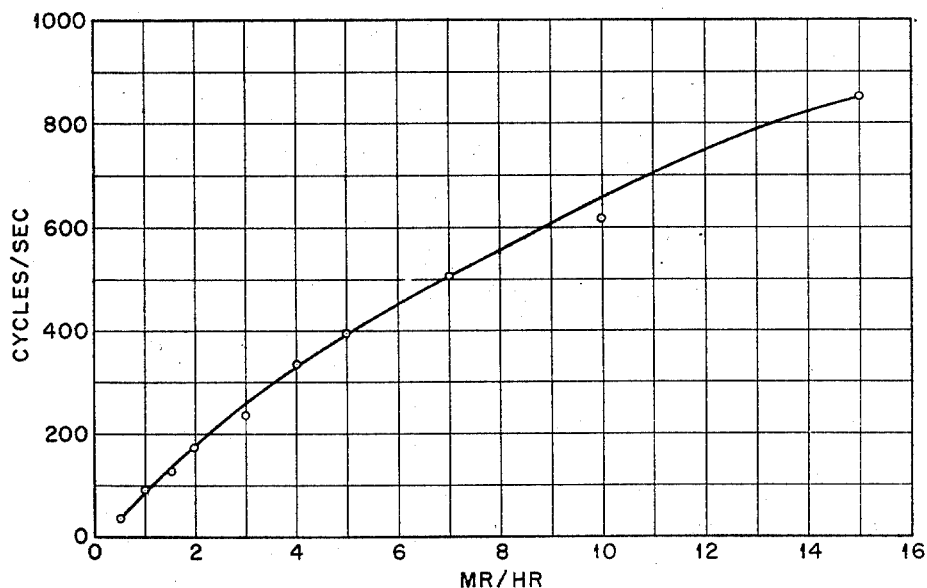
Figure 8 is a graph similar to Figure 6.

If, however, the Geiger counter-ferroelectric condenser circuit shown in Figures 3 and 4 is utilized, the counter remains connected to the power source so that leakage has no effect; hence harmonics of the fundamental frequency can be reliably transmitted and received. The resulting great increase in sensitivity is shown in Figure 8. A change from 1 to 15 mr./hour produces a change from about 90 to 850, or 760 cycles per second, for example.

Figure 7:
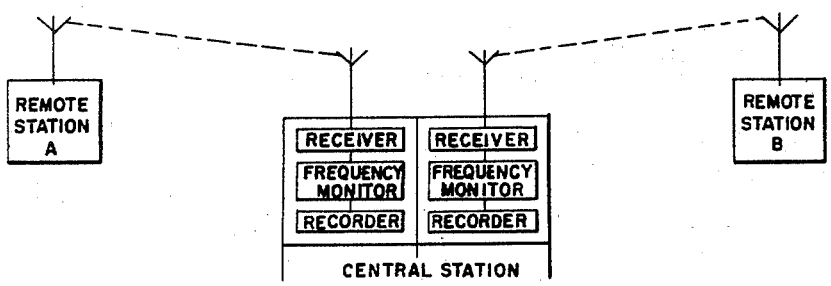
Figure 7 shows schematically a system for remote radiation monitoring according to my invention.

Referring now to Figure 7, a plurality of remote monitoring stations such as A, B, each provided with a transmitting antenna, are shown disposed about a central receiving station. The station may be equipped with standard, commercially available receiving antennae, receivers, frequency measuring equipment, and recorders. Each remote station is preferably provided with two oscillators of the type heretofore described, each pair of oscillators being set to transmit on different frequencies so that information may be received simultaneously at the central station. In operation, the oscillator pairs located at remote stations transmit on their assigned frequencies, those signals are picked up by corresponding receiving antennae, the respective beat frequencies of the signals are measured, and the measured beat frequencies are recorded. If radiation falls upon the detector at any station, the corresponding oscillator will change frequency, and that changed frequency will be detected by the frequency measuring equipment at the central station and indicated by a change in the respective recorder signal. Thus, instantaneous radiation levels at any number of remote points may be clearly visualized from the central or control station.

Figure 9:
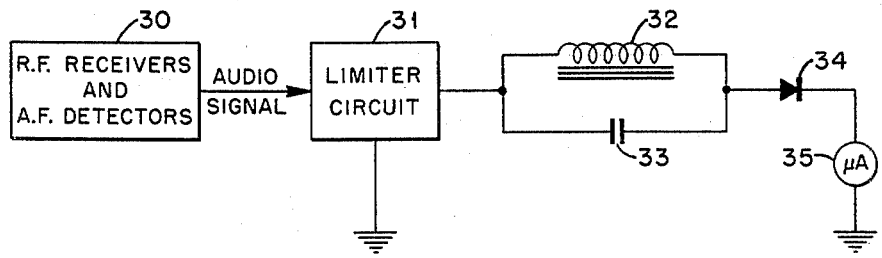
Figure 9 shows a simple receiving circuit.

One advantage of the system described is the simplicity of the receiving equipment required. The two frequencies generated by oscillators 10, 20 of Figure 4 may be received on a conventional receiving antenna and fed to any conventional radio-frequency receiver, in which they will produce an audio-frequency signal at their beat frequency. The frequency of this audio signal may be measured by any desired means, as by an oscilloscope, or by the simple equipment shown in Figure 9. After passing through the R-F receiver and audio detector 30, the audio signal is fed through a conventional limiter circuit 31 to provide a constant voltage output. Then the signal is fed to a simple frequency-discriminating network such as inductance 32 and condenser 33, which may be .25 henry and .1 μ farad. The resulting signal is rectified by diode 34 and indicated on microammeter 35. Other more elaborate frequency monitors may be utilized if desired.

Having described my invention, what is claimed as novel is:

1. A monitor for ionizing radiation comprising a Geiger counter including first and second electrodes and a counting gas disposed in an envelope, first and second resistance means, a source of energizing voltage having one terminal coupled to said first electrode through said first resistance means and the other terminal coupled to said second electrode, a first condenser bridged across said second resistance means and coupled to said first electrode to form a pulse-integrating network, a ferroelectric condenser element having first and second electrodes and a ferroelectric dielectric material therebetween, one of said condenser electrodes being coupled to said second resistor and the opposite condenser electrode being coupled to a fixed point on said energizing source, an electrical oscillator provided with a tuning circuit including said ferroelectric condenser and a crystal for stabilizing the oscillator frequency in the absence of radiation, and means for measuring the frequency of oscillation of said oscillator.

2. A monitor for ionizing radiations comprising first and second vacuum tube oscillator circuits provided with respective vacuum tubes and respective tuning circuits, each of said vacuum tubes having a heater, a common source of current coupled to both heaters to energize the same; a voltage source; a first circuit including a first resistance, a Geiger counter coupled to said source through said resistance, a second resistance coupled to said first resistance, a parallel resistor-condenser network coupled to said second resistance, a ferroelectric condenser element coupled to said parallel network and to said voltage source to form a series circuit with said counter and said resistances to establish a selected initial voltage across said ferroelectric condenser in the absence of a discharge in said counter; a second substantially identical ferroelectric condenser disposed adjacent said first ferroelectric condenser and connected across a selected portion of said voltage source, respective means for controlling the frequencies of said oscillators, including respective crystals and said first and second ferroelectric condensers disposed in said oscillator tuning circuits, mixer circuit coupling means coupled to both said oscillators to provide a beat frequency output responsive to a change in frequency of one of said oscillators, and means to measure and indicate said beat frequency.

References Cited in the file of this patent

UNITED STATES PATENTS

| | | |
|---|---|---|
| 1,912,213 | Nicolson | May 30, 1933 |
| 2,461,307 | Anlalak | Feb. 8, 1949 |
| 2,473,556 | Wiley | June 21, 1949 |
| 2,526,207 | Donley et al. | Oct. 17, 1950 |
| 2,526,425 | Schultheis | Oct. 17, 1950 |
| 2,662,985 | Good | Dec. 15, 1953 |